March 9, 1943.    R. MARAIS    2,313,203
WINDSCREEN WIPER HAVING A WIDE SWEEPING ACTION
Filed Dec. 28, 1939    2 Sheets-Sheet 1
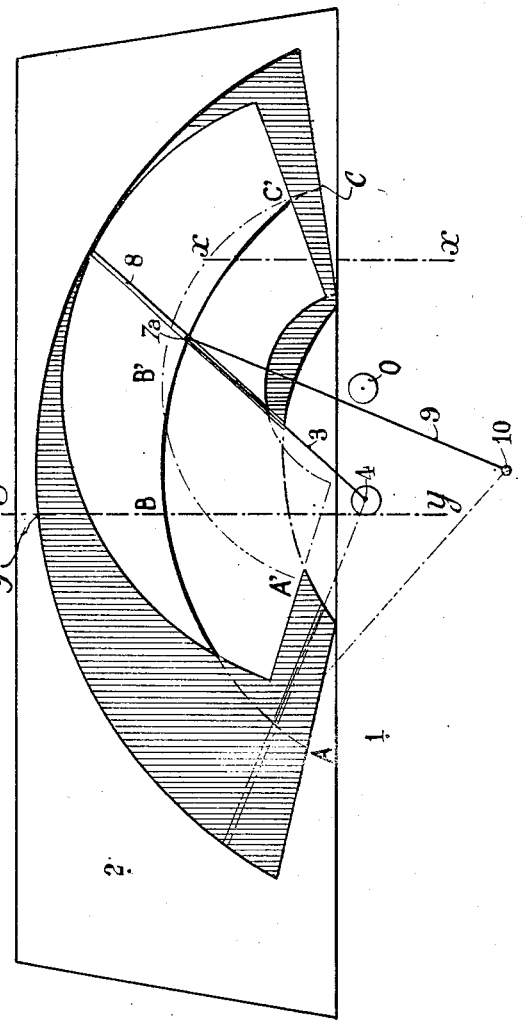
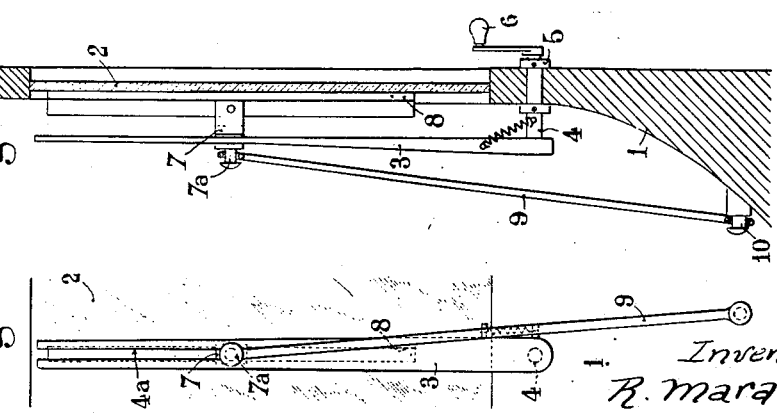
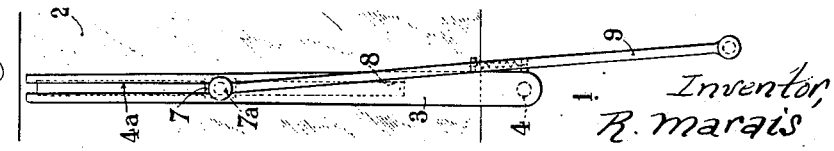
Inventor,
R. Marais
By: Glascock Downing & Seebold

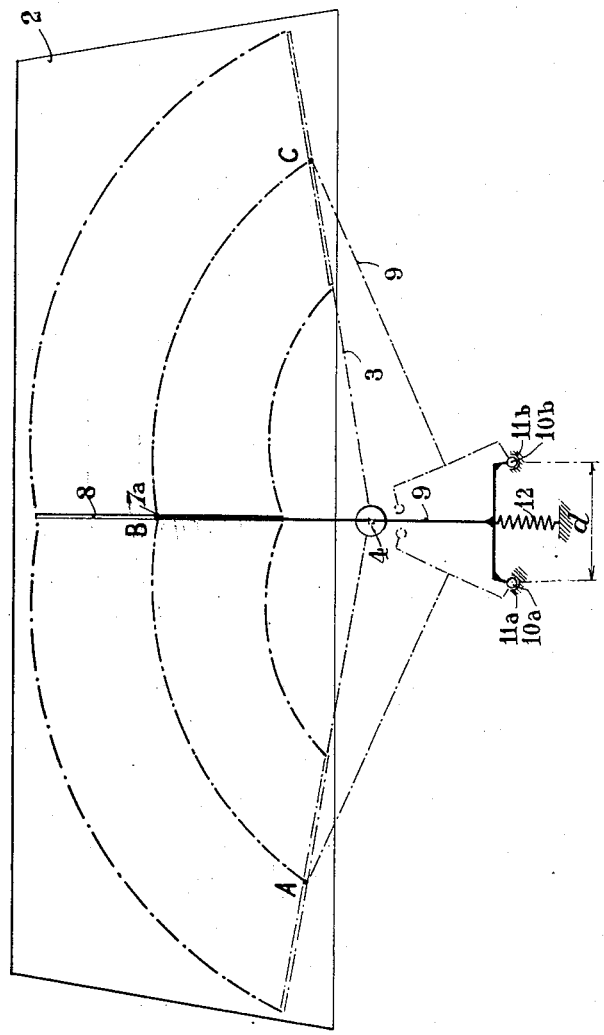

Patented Mar. 9, 1943

2,313,203

UNITED STATES PATENT OFFICE 2,313,203

WINDSCREEN WIPER HAVING A WIDE SWEEPING ACTION

René Marais, Paris, France; vested in the Alien Property Custodian

Application December 28, 1939, Serial No. 311,434
In France December 31, 1938

3 Claims. (Cl. 15—255)

The present invention has for its object a windscreen wiper so arranged as to sweep a large portion of the windshield surface of a motor vehicle.

This apparatus is of the type having a single wiper carried by an arm to which is imparted a rocking movement about a fixed pivot which is mounted on the body or on the wind-shield itself.

Up to now, the wiper is connected to a given point of the rocking arm by a pivotal joint ensuring its satisfactory contact with the windscreen and it sweeps a zone concentric with the fixed pivot carrying the rocking arm. This zone is rather limited as said pivot pin cannot practically be located far from the edge of the windshield.

According to the present invention, the wiper is movable along the rocking arm which carries it and is guided on the latter so as to be invariably orientated relatively to said arm during its rocking movement about the fixed pivot. A connection provided between the wiper, the body and the rocking arm or its driving mechanism, compels the wiper to move along the arm in function of its inclination to the right or to the left from the vertical, in such a manner that the wiper passes no longer over a zone concentric with the pivotal axis of the wiper-carrying arm, but a surface which is appreciably wider and more elongated in the horizontal direction, for one and the same angle of oscillation of said arm.

This connection can be constituted for instance, by a simple connecting-rod pivoted to the wiper and to the body at a suitable distance from the pivotal axis of the wiper-carrier.

The windscreen wiper thus devised can be actuated by hand or by any driving mechanism, acting either on the pivot pin of the wiper-carrying arm, or on the connecting-rod previously mentioned, or on any other movable part of the windscreen wiper.

By way of example, the accompanying drawings illustrate two embodiments of the windscreen wiper according to the invention.

Fig. 1 is a front elevation of the windscreen wiper.

Fig. 2 is a side view thereof.

Fig. 3 is a diagram indicating the successive positions of the members and the extent of the portion swept on the wind-shield.

Fig. 4 is a diagrammatic elevation of the second embodiment.

In the drawings, 1 designates the body of the vehicle, 2 the wind-shield, 3 the wiper-carrying arm secured on a spindle 4 which is journalled in a bearing 5 secured to the body below the windshield. Said spindle 4 is actuated for instance by hand by means of a handle 6.

According to the invention, the arm 3 is provided with a slideway 4a along which slides a slide-block 7 on which the wiper 8 is pivoted so as to press against the wind-shield.

The slide-block 7 is provided with a trunnion 7a on which is pivoted a connecting-rod 9 which connects it to another trunnion 10 secured to the front of the body at a certain distance below the spindle 4. In Fig. 3, $x$—$x$ indicates the outline of the vertical plane passing through the axis of the steering wheel of the vehicle and $y$—$y$ the outline of the vertical median plane of the vehicle body. 0 designates the position generally adopted for the spindle 4, which position must not be far from the plane $x$—$x$, so that the steering wheel hindered the operation of the handle 6.

According to the invention, the pivot pin 10 of the connecting-rod 9 and the shaft 4 of arm 3 are, on the contrary, placed near the median plane $y$—$y$ of the body. However, the length of the connecting-rod 9 is such that the arc of circle ABC described by the trunnion 7a, that is to say by the centre of the wiper 8 extends on the driver's side at least as far as the arc A'B'C' described by the centre of the known type of wiper about the point 0.

In Fig. 3 the field of the sweeping action obtained according to the invention is indicated by the vertical shaded area, and that obtained by an ordinary windscreen wiper by the clear area within the shaded area. It will be seen that the field swept over is now considerably increased and extends opposite the person seated next to the driver. If the pivot pin 10 was located in the plane $y$—$y$, the field swept over would be quite symmetrical relatively to the center of the vehicle body, but in the example illustrated, the pivot pin 10 is offset towards the driver so as to give the latter a slightly more extended field of vision.

It is to be noted that as the handle 6 is now adjacent to the median plane $y$—$y$, whereby it can be operated without the steering wheel causing any constraint.

The embodiment illustrated in Fig. 4 differs from the preceding one by the fact that the connecting-rod 9 pivoted on the wiper-carrying slide-block at 7a comprises at its base two pivots 10a and 10b spaced from each other according to a distance $d$ and taking a bearing on two fixed bearings 11a and 11b, from which they can disengage upwardly, in opposition to the action of a spring 12 which pulls the connecting-rod down- The drawings clearly show that when the arm 3 is in its median position, the connecting-rod 9 rests on both its bearings and if it is moved towards the left about the pivot pin 4, it draws along the slide-block 7 which compels the connecting-rod to rock on its pivot 10a and is thus guided according to an arc BA concentric with the bearing 11a. If the arm is moved towards the right, the connecting-rod rocks on its pivot 10b and the journal 7a describes an arc BC concentric with the bearing 11b.

The wiper is thus moved in such a manner that it cleans a very wide zone on either side of the vertical plane passing through the pivot pin 4, which can be located in the median plane of the car or near said plane.

In the embodiment illustrated, the device according to the invention can be very simply and strongly constructed. The sweeping curve can be varied by modifying the length of the connecting-rod, or the length of the slideway 4a and the position of the bearing point or points of the connecting-rod. It is possible to arrange the control for the windscreen wiper at a place which is most suitable to the manufacturer or the operator. The control may be reversed and the axes of rotation placed at the top of the windshield.

I claim:

1. A windshield wiper for vehicles comprising, an arm, means pivotally supporting said arm for swinging movement in an arcuate path over the windshield, said arm having a longitudinally extending slot therein, a wiper blade, means slidably mounted in said slot for supporting said blade, a bearing arranged laterally of a vertical plane passing through the pivot means for said arm, a second bearing arranged opposite the first arm, and laterally of the vertical plane passing through the pivot means for said arm, a rod pivotally connected at one end to said blade supporting means, two pivots carried by said rod and arranged to be alternately journaled respectively in said bearings, and yieldable means retaining one of the pivots in an associated bearing during swinging movement of the arm laterally of said vertical plane.

2. A windshield wiper for vehicles comprising, a rotatable driving shaft, an arm having a longitudinal slide-way therein connected to said shaft for moving in an arcuate path over the windshield, a block mounted for sliding movement only in said slide-way, a wiper-blade connected to said block and arranged in the direction of the longitudinal axis of said arm, a trunnion on said block, a stationary trunnion arranged at a point located beyond said driving shaft with respect to said arm and laterally separated from a substantially vertical plane passing through the axis of said shaft, and a rod pivotable at one end on the trunnion of said block and pivotable at the other end on said stationary trunnion.

3. A windshield wiper for vehicles comprising, a rotatable driving shaft, an arm having a longitudinal slide-way therein connected to said shaft for moving in an arcuate path over the windshield, a block mounted for sliding movement only in said slide-way, a wiper-blade connected to said block and arranged in the direction of the longitudinal axis of said arm, a trunnion on said block, two bearings arranged beyond said shaft with respect to said arm and on both sides of a vertical plane passing through the axis of said shaft, a rod pivoted at one end on the trunnion of said block and having at the other end two trunnions arranged to be alternately journalled in said bearings, and a spring attached at one end to said rod and at the other end to a stationary point between said bearings.

RENÉ MARAIS.